J. JOHNSON.
Steam Heater.
No. 76,329. Patented April 7, 1868.
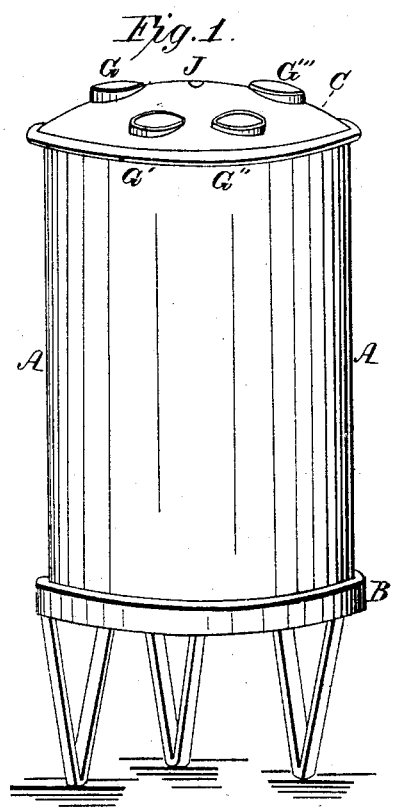
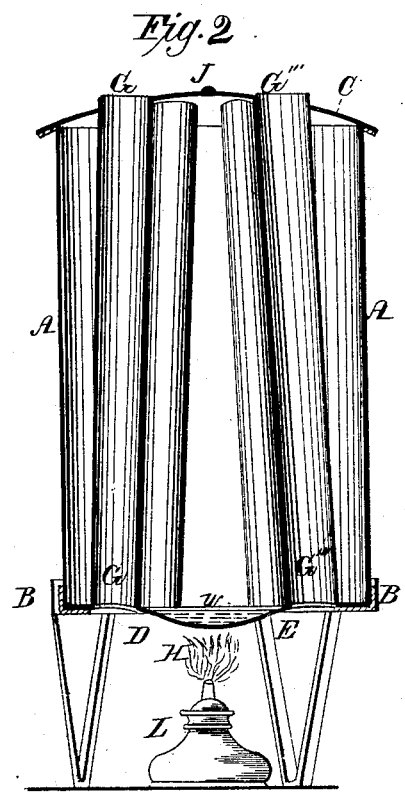

United States Patent Office.

JOHN JOHNSON, OF SACO, MAINE.

Letters Patent No. 76,329, dated April 7, 1868.

IMPROVEMENT IN HEATING-APPARATUS.

*The Schedule referred to in these Letters Patent and making part of the same.*

TO ALL WHOM IT MAY CONCERN:

Be it known that I, JOHN JOHNSON, of Saco, in the county of York, and State of Maine, have invented a new and useful "Improvement in Apparatus for the Radiation and Distribution of Heat;" and I do hereby declare that the following is a full and exact description of the same, reference being had to the accompanying drawings, making a part of this specification.

My invention is designed to effect the radiation, diffusion, and distribution of heat, either in the apartment in which the apparatus is situated, or by the use of pipes, for the conveyance of heated air, to warm rooms, halls, and passages, at any required distance from the source of heat.

I have had in view, in the apparatus herein described, the construction of a heater that will produce a large amount of heat in proportion to the coal consumed, and the disuse of all stop-cocks, either for steam or water, while at the same time I dispense with water-pipes, valves, and steam-pipes, all of which enhance the cost of the heaters now in use.

Great inconvenience is experienced in the use of the hot-water heaters and the steam-heaters heretofore made, on account of injury to carpets, furniture, and ceilings, by leaks. The system I am about to describe is free from these disadvantages.

Figure I is a perspective view, and

Figure II a vertical section of the apparatus.

The same letters refer to like parts in both of the drawings.

The cylindrical vessel A rests at the bottom upon a suitable stand, B, which supports it above the flame of a lamp or gas-burner, this support being of brick-work, and provided with a suitable grate and ash-pit, when coal is used as the source of heat. A series of air-tight pipes, G G' G'', extends from the bottom, D E, of the cylinder, to the top, C. These pipes are contained within the cylinder, and have both of their ends open, to allow the free passage of air in the direction of the arrows. The ends of these open pipes are brazed or soldered, steam-tight, to the top and the bottom of the cylinder A, thus forming an air-tight vessel. The central part of the bottom, D E, is convex, projecting downwards, as shown in the drawings.

It is obvious that if the vessel A contains a large quantity of water, and sufficient heat be applied, as at L H, the apparatus would be burst. I therefore make use of a very small amount of water, W, which is introduced at the aperture J at the top of the cover, this opening being soldered up after the air has been partially or wholly exhausted from the cylinder A.

The quantity of water to be used in the cylinder is to be varied in proportion to the size of the cylinder; that is to say, the cubical contents of the space within the cylinder must bear a definite relation to the quantity of water that is placed at the bottom of the cylinder to be heated and converted into steam—say about two cubic inches of water to each cubic foot of space in the steam-chamber. When the whole of the water is evaporated, and the cylinder filled with steam, the application of more heat at the bottom of the vessel merely superheats the steam, without materially increasing the pressure. When the fire is out and the temperature reduced, the steam is condensed, and the water again takes its place at the base of the cylinder. This operation is also constantly going on when the apparatus is in use, the amount of condensation being in proportion to the temperature of the external air to which the cylinder is exposed.

One advantage attending the use of this system is, that heat is evolved without delay, and is ready for use as soon as ebullition takes place. On account of the small quantity of water used, no injury is caused to the apparatus if it is frozen.

Instead of exhausting the air, as before named, the same effect may be produced by boiling the water, W, and soldering or closing the aperture J as soon as the steam has expelled the air from the vessel A.

Heat may be applied in this way to chemical drying-ovens with great convenience, a part of the interior of the steam-vessel being formed into an oven or compartment, and provided with a suitable door.

In some cases the water may be placed in a coiled-iron pipe, having one open end attached to the bottom of the cylinder and the other end closed, the coil being placed in the fire. By this arrangement, the bottom, D E, is protected from the direct action of the heat.

Instead of inserting the air-tubes G G' within the cylinder, a casing may surround it, and the air be circulated between the casing and the cylinder. The cylinder A should be of such form as to offer the greatest resistance to atmospheric pressure, to prevent collapsing. The air-pipes G G', or the space within the casing above named, may be supplied with the outer air by means of the common wooden air-box, and tin conducting-pipes may lead to different apartments, as in the common hot-air furnace.

What I claim, and desire to secure by Letters Patent, is—

The method of obtaining and transmitting heat, by the use of a small and definite quantity of water or other liquid contained in an air-tight vessel, substantially as herein described.

JOHN JOHNSON. [L. S.]

Witnesses:
   JOHN M. BATCHELDER,
   H. TEMPLE.